(12) United States Patent
Shiotani et al.

(10) Patent No.: US 7,597,808 B2
(45) Date of Patent: Oct. 6, 2009

(54) APPARATUS AND METHOD FOR TREATING WASTEWATER CONTAINING NITROGEN-CONTAINING DYES

(75) Inventors: Tadao Shiotani, Osaka (JP); Yuko Takami, Osaka (JP); Seiichi Nakahara, Osaka (JP)

(73) Assignee: Kuraray Co., Ltd., Kurashiki (JP)

( * ) Notice: Subject to any disclaimer, the term of this patent is extended or adjusted under 35 U.S.C. 154(b) by 324 days.

(21) Appl. No.: 11/484,685

(22) Filed: Jul. 12, 2006

(65) Prior Publication Data

US 2006/0249450 A1    Nov. 9, 2006

Related U.S. Application Data

(63) Continuation of application No. 10/600,349, filed on Jun. 23, 2003, now abandoned.

(30) Foreign Application Priority Data

Jun. 24, 2002  (JP)  .............................. 2002-183246

(51) Int. Cl.
*C02F 3/10* (2006.01)
*C02F 3/30* (2006.01)

(52) U.S. Cl. ........................ 210/605; 210/616; 210/150; 210/903; 210/917

(58) Field of Classification Search ................. 210/605, 210/630, 615–617, 622, 195.1, 252, 150, 210/903, 917
See application file for complete search history.

(56) References Cited

U.S. PATENT DOCUMENTS

| | | | |
|---|---|---|---|
| 4,384,956 A | 5/1983 | Mulder | |
| 4,626,354 A | 12/1986 | Hoffman et al. | |
| 5,393,427 A | 2/1995 | Barnard | |
| 5,578,214 A | 11/1996 | Yamasaki et al. | |
| 5,919,367 A | 7/1999 | Khudenko | |
| 6,007,712 A * | 12/1999 | Tanaka et al. | ................ 210/151 |
| 6,054,044 A | 4/2000 | Hoffland et al. | |
| 6,461,511 B1 | 10/2002 | Baba et al. | |

FOREIGN PATENT DOCUMENTS

| | | |
|---|---|---|
| EP | 0 426 933 | 5/1991 |
| EP | 0 861 808 | 9/1998 |
| EP | 0 979 803 | 2/2000 |

OTHER PUBLICATIONS

Jia Shengfu, et al. "The Properties of Decolorization of Dyes by Sulfate-Reducing Bacteria", Institute of Microbiology, Chinese Academy of Science, Beijing, Sep. 22, 2008.

(Continued)

*Primary Examiner*—Frank M Lawrence
(74) *Attorney, Agent, or Firm*—Oblon, Spivak, McClelland, Maier & Neustadt, L.L.P.

(57) ABSTRACT

A wastewater treatment apparatus comprises a nitrogen-containing dye containing wastewater inlet connected to an obligatory anaerobic tank to bring wastewater containing a nitrogen-containing dye into contact with sulfate-reducing bacteria under obligatory anaerobic conditions, a nitrification tank to bring the wastewater into contact with nitrifying bacteria under aerobic conditions, and a denitrification tank to bring the wastewater into contact with the denitrifying bacteria under anaerobic conditions.

14 Claims, 2 Drawing Sheets

OTHER PUBLICATIONS

Figure 1:
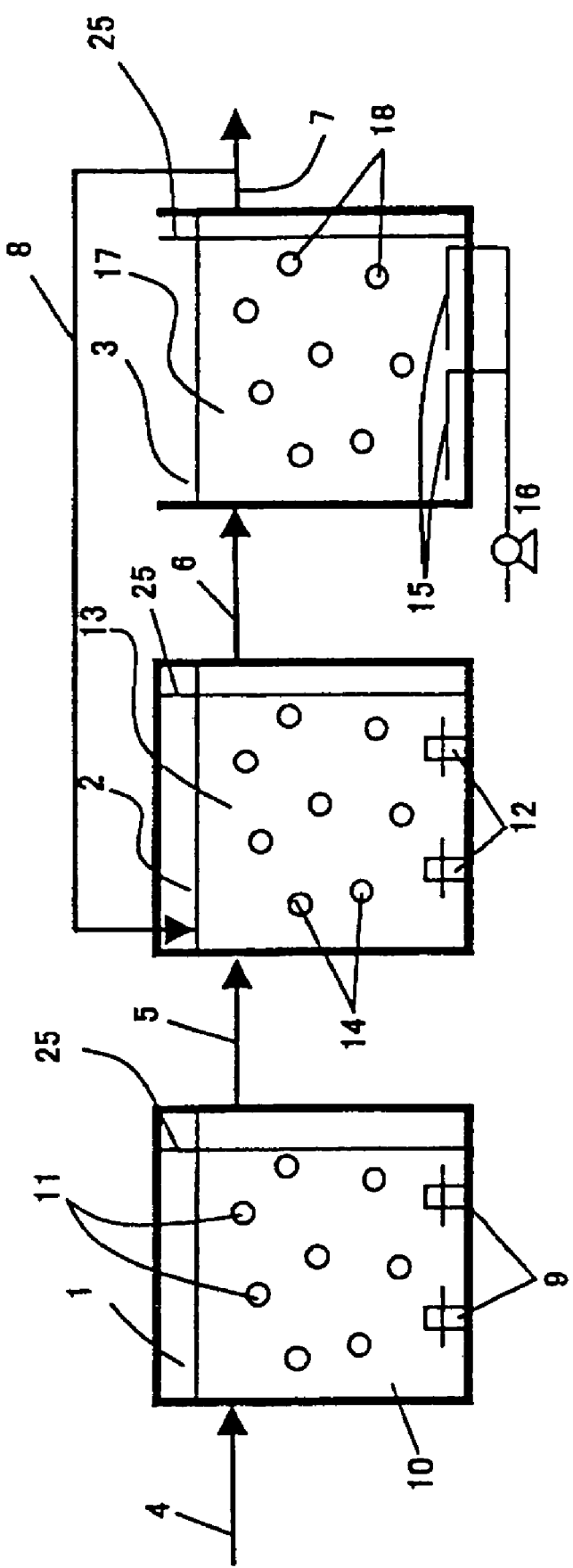

R. Krull, et al., Chemie Ingenieur Technik, vol. 72, No. 9, XP-002258473, pp. 1113-1114, "Konzept Zur Technischen Umsetzung Einer Zweistufigen Anoxischen Und Aeroben Textilabwasserbehandlung", 2000.

A. Stolz, Applied Microbiology and Biotechnology, vol. 56, No. 1-2, XP-002258474, pp. 69-80, "Basic and Applied Aspects in the Microbial Degradation of Azo Dyes", Jul. 2001.

C. O'Neill, et al., Applied Microbiology and Biotechnology, vol. 53, No. 2, XP-002258475, pp. 249-254, "Azo-Dye Degradation in an Anaerobic-Aerobic Treatment System Operating on Simulated Textile Effluent", Feb. 2000.

R. Krull, et al., Water Science and Technology, vol. 38, Issues 4-5, Abstract of "Combined Biological and Chemical Treatment of Highly Concentrated Residual Dyehouse Liquors", 1998.

* cited by examiner

APPARATUS AND METHOD FOR TREATING WASTEWATER CONTAINING NITROGEN-CONTAINING DYES

(a) BACKGROUND OF THE PRIOR ART

1. Technical Field

The present invention relates to a wastewater treatment apparatus which biologically decolorizes and denitrifies wastewater containing a nitrogen-containing dye. More specifically, the invention pertains to a wastewater treatment apparatus capable of easily decolorizing and decomposing, at a low cost, a persistent nitrogen-containing dye such as an azo compound in wastewater containing a dye, being compact, having excellent durability and high processing power and ensuring long-term stable operation.

2. Description of the Prior Art

Nitrogen-containing dyes, particularly, azo dyes account for the largest proportion of all synthetic dyes. They are used in various fields such as fibers, foods and cosmetics When dye-containing wastewater discharged from dye manufacturing plants and the like is released into the environment, it colors the surrounding environment and impairs the environment and beautiful appearance. There is accordingly an increasing demand for the decolorization or detoxification of the above-described dye existing in the wastewater. Wastewater containing dyes have conventionally been treated mainly as a mixture with another wastewater by the activated sludge process under aerobic conditions. The activated sludge process however only removes BOD (Biochemical Oxygen Demand) and SS (Suspended Substance) components from the wastewater. Many dyes are persistent nitrogen-containing compounds such as azo dyes. Since they cannot be removed biologically by the activated sludge process, the wastewater has been released into the environment without removing therefrom coloring or nitrogen components derived from these dyes.

As a method of physically removing a dye-containing substance from wastewater, it is known to treat dye-containing wastewater by the activated sludge process, physically separating the dye from the wastewater by solidify the dye-containing substance with the aid of coagulating sedimentation or by adsorbing the substance onto activated charcoal or the like: and then reclaiming the dye. This method is however accompanied with such a drawback that the persistent dye which has remained undecomposed exerts a bad influence on the environment when it is released thereinto. In order to avoid such an influence, only a limited landfill site can be used.

As a method of chemically decomposing a dye-containing substance in wastewater, proposed are, for example, a method of decomposing the dye by bringing it into contact with ozone (Japanese Patent Laid-Open No. 239383/1997), a method of bringing it in contact with oxygen under humid conditions, thereby oxidizing it (Japanese Patent Laid-Open No. 253669/1997), a method of bringing it in contact with an enzyme, thereby decomposing it (Japanese Patent Laid-Open No. 2000-245468). and a method of decomposing it under supercritical conditions (Japanese Patent Laid-Open No. 2001-121137). Any one of these methods however involve drawbacks such as necessity of an extra cost for chemicals and facilities and generation of by-products which disturb treatment.

As described above, an apparatus for treating dye-containing wastewater capable of decolorizing and decomposing, at a low cost, a persistent nitrogen-containing dye such as azo compound to an extent not having an adverse environmental effect is not known. An object of the present invention is therefore to provide a wastewater treating apparatus capable of easily decolorizing and decomposing, at a low cost, a persistent nitrogen-containing dye such as azo compound in wastewater containing a nitrogen-containing dye, being compact, having excellent durability and high processing power, and ensuring long-term stable operation.

(b) SUMMARY OF THE INVENTION

According to the present invention, the above-described object can be attained by a wastewater treatment apparatus which is equipped with an obligatory anaerobic tank in which wastewater containing a nitrogen-containing dye Is brought into contact with sulfate reducing bacteria under obligatory anaerobic conditions, a nitrification tank in which the wastewater is brought into contact with nitrifying bacteria under aerobic conditions, and a denitrification tank in which the wastewater is brought into contact with denitrifying bacteria under anaerobic conditions, thereby decolorizing and denitrifying the wastewater containing a nitrogen-containing dye. More specifically, the present invention relates to a wastewater treatment apparatus in which denitrification is carried out in a nitrification/denitrification step or denitrification/nitrification step after decolorization in the obligatory anaerobic step in order to prevent the waste water from being colored again.

The above-described wastewater treatment apparatus of the present invention may have, for example, a structure in which the obligatory anaerobic tank, denitrification tank and nitrification tank are disposed in the order of mention and a portion of nitrified wastewater discharged from the nitrification tank is returned and circulated to the denitrification tank. In a preferred embodiment, the bacteria are immobilized by a microorganism immobilization support in at least one tank selected from the obligatory anaerobic tank, nitrification tank and denitrification tank. Alternatively, the wastewater treatment apparatus may have a structure in which the obligatory anaerobic tank, nitrification tank and denitrification tank are disposed in the order of mention and a re-aeration tank is disposed downstream of the denitrification tank in order to bring BOD decomposing bacteria into contact with wastewater under aerobic conditions. In a preferred embodiment, the bacteria are immobilized by a microorganism immobilization support in at least one tank selected from the obligatory anaerobic tank, nitrification tank, denitrification tank and re-aeration tank.

In a more preferred embodiment, the microorganism immobilization support may be at least one support selected from gelled supports, plastic supports and fibrous supports, of which use of a polyvinyl alcohol hydrogel as the microorganism immobilization support is still more preferred.

The wastewater treatment apparatus according to the present invention can easily decolorize and decompose, at a low cost, a persistent nitrogenous compound in wastewater containing a nitrogen-containing dye, is compact, has excellent durability and high processing power and ensures long-term stable operation.

(c) BRIEF DESCRIPTION OF THE DRAWINGS

Figure 2:
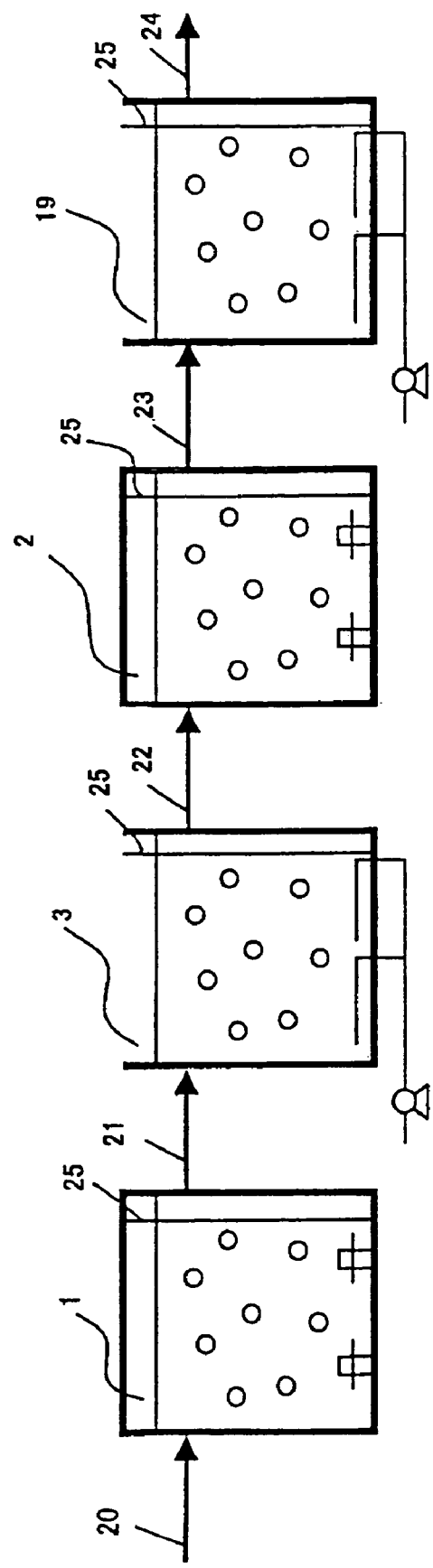

FIG. 1 is a flow chart illustrating a wastewater treatment apparatus according to a first embodiment of the present invention; and FIG. 2 is a flow chart illustrating a wastewater treatment apparatus according to a second embodiment of the present invention.

(d) DETAILED DESCRIPTION OF THE PREFERRED EMBODIMENT

The term "nitrogen-containing dye" as used herein means, among acid dyes, acid mordant dyes, metal complex salt dyes, basic dyes, direct azo dyes, azoic dyes and reactive dyes, water soluble dyes having a chemical structural formula which includes therein nitrogen, particularly, an azo bond. Examples of nitrogen-containing dyes include aniline azo dyes such as Acid Orange 10, sulfanilic acid azo dyes such as Acid Orange 1 and Acid Orange 24, naphthol azo dyes such as Acid Orange 7 and Acid Orange 8, naphthylamine azo dyes such as Acid Blue 92 and Acid Blue 120, anthraquinone dyes such as Acid Blue 82 and Acid Blue 126, pyrazolone azo dyes such as Acid Yellow 11 and Acid Yellow 17, and azoic dyes such as Azoic Diazo Component 1 and Axoic Diazo Component 27.

The term "sulfate reducing bacteria" as used herein means obligatory anaerobic bacteria such as Desulfovibrio desulfurican. They are known bacteria which reduce a sulfate to hydrogen sulfide by sulfate respiration. In an obligatory anaerobic tank, the nitrogen-containing dye is decomposed by the above-described sulfate reducing bacteria under obligatory anaerobic conditions.

The term "obligatory anaerobic conditions" means the conditions in which a redox potential in a liquid, If this potential being used as an index, is usually −200 mV or less when the pH in the liquid is 7.

In the present invention, a predetermined amount of organic matters must exist in the obligatory anaerobic tank upon syntheses of a respiratory substrate or cell of sulfate reducing bacteria or decomposition of the nitrogen-containing dye. Examples of the organic matters to be added usually include alcohols. Of these, methanol and ethanol tend to be employed.

In the present invention, it is preferred that bacteria have been immobilized by a microorganism immobilization support in at least one tank selected from the above-described obligatory anaerobic tank, nitrification tank, denitrification tank and re-aeration tank. A process using the microorganism immobilization support (which process will hereinafter be called "support process" simply) is better than the activated sludge process, because the former one does not require sludge return, which facilitates operation and maintenance of each tank; particularly in the obligatory anaerobic tank, a fine pore passes through from the surface of the support toward the central part of the support, and use of acetalized polyvinyl alcohol gel which facilitates habitation of anaerobic microorganisms inside of the support improves habitation property of the sulfate reducing bacteria: complete sealing as employed in the activated sludge process under obligatory anaerobic conditions is not necessary; and the capacity of the reaction tank can be reduced to make the tank compact.

The microorganism immobilization support suitably employed in the present invention is a solid having fine pores which will serve as a habitat for the microorganisms. Examples of the material for the support include vinyl alcohol based resins such as polyvinyl alcohol, ether based resins such as polyethylene glycol, acrylic resins such as polymethacrylic acid, acrylamide based resins such as polyacrylamide, olefin based resins such as polyethylene and polypropylene, styrene based resins such as polystyrene, ester based resins such as polyethylene terephthalate and polybutylene terephthalste, acrylonitrile based resins such as polyacrylonltrile, urethane based resins such as polyurethane sponge, polysaccharides such as calcium alginate, k-carrageenan, agar, and cellulose derivatives, photocuring resins such as polyester acrylate, epoxy acrylate and urethane acrylate, and porous inorganic compounds such as activated charcoal. Of these, polyvinyl alcohol hydrogels are preferred because they have a structure which is porous and network even inside of the gels and can absorb a large amount of water in the gels. More preferred examples include formalized polyvinyl alcohol hydrogel and acetalized polyvinyl alcohol hydrogel. The microorganism immobilization supports may be used either singly or in combination. From the viewpoints of a wastewater treatment efficiency and support fluidity, its filling ratio is, based on the capacity of the tank, preferably 1% or greater but not greater than 50%, with a ratio of 3% or greater but not greater than 30% being more preferred.

FIG. 1 is a flow chart of a wastewater treatment apparatus according to a first embodiment of the present invention, which is structured to have an obligatory anaerobic tank, denitrification tank and nitrification tank disposed in the order of mention and to return and circulate a portion of water discharged from the nitrification tank after nitrification treatment to the denitrification tank. In FIG. 1, bacteria in the absolute anaerobic tank 1, denitrification tank 2 and nitrification tank 3 are immobilized by the microorganism immobilization supports 11, 14 and 18, respectively. Wastewater 4 containing a nitrogen-containing dye is fed to the obligatory anaerobic tank 1, in which it is brought into contact with sulfate reducing bacteria under obligatory anaerobic conditions to decompose the nitrogen-containing dye.

At the bottom of the obligatory anaerobic tank 1, an agitator 9 is disposed, by which stirring is conducted in order not to cause friction of the microorganism immobilization supports each other. The microorganism immobilization support 11 has been poured in a a mixture 10, which contains microorganisms such as sulfate reducing bacteria, in the obligatory anaerobic tank 1. When the agitator 9 is started, a circulating flow of the mixture 10 occurs in the portion of the obligatory anaerobic tank 1. This circulatory flow causes flow of the microorganism immobilization support 11 in the obligatory anaerobic tank 1, during which microorganisms composed mainly of the sulfate reducing bacteria existing in the mixture 10 are caused to adhere to, combine with and immobilize onto the microorganism immobilization support 11.

The wastewater thus treated 5 is denitrified by denitrifying bacteria in the denitrification tank 2 under anaerobic conditions. At the bottom of the denitrification tank 2, an agitator 12 is disposed for carrying out stirring in order not to cause friction of the microorganism immobilization supports each other. The microorganism immobilization support 14 has been poured in a mixture 13, which contains microorganisms such as the denitrifying bacteria, in the denitrification tank 2. When the agitator 12 is started, a circulatory flow of the mixture 13 occurs in the denitrification tank 2. This circulatory flow causes flow of the microorganism immobilization support 14 in the denitrification tank 2, during which microorganisms composed mainly of the denitrifying bacteria existing in the mixture 13 are caused to adhere to, combine with and immobilize onto the microorganism immobilization support 14. The organic matters in the mixture 13 are utilized as a source for respiratory substrate of denitrifying bacteria or for cell synthesis. Similar to the case of the obligatory anaerobic tank, an alcohol (such as methanol or ethanol) may be added from the outside of the system if necessary.

The denitrified wastewater 6 is then fed to the nitrification tank 3 and is brought into contact with the nitrifying bacteria in the nitrification tank 3 under aerobic conditions, whereby the denitrified water 6 is nitrified. At the bottom of the nitrification tank 3, an air diffuser 15 for feeding an oxygen-containing gas such as air is installed in connection with a blower 16. A microorganism immobilization support 18 has been poured in a mixture 17, which contains microorganisms such as nitrifying bacteria, in the nitrification tank 3, when air comes from the air diffuser 15, oxygen is fed to the mixture 17 in the nitrification tank 3 and at the same time, a circulatory flow of the mixture 17 occurs owing to the resulting ascending air bubble flow. While this circulatory flow causes flow of the microorganism immobilization support 18 in the nitrification tank 3, microorganisms composed mainly of the nitrifying bacteria existing in the mixture 17 are caused to adhere to, combine with and immobilize onto the microorganism immobilization support 18. By the thus-immobilized nitrifying bacteria and floating nitrifying bacteria, biological treatment of the mixture 17 in the nitrification tank 3 is carried out.

A portion of the nitrified wastewater 7 is introduced into the denitrification tank 3, as water 8 to be returned and circulated and is denitrified under anaerobic conditions. A remaining portion of the nitrified wastewater 7 is released or recycled after removal therefrom of the solid content in the nitrified wastewater 7 by the ordinarily employed method such as coagulating sedimentation treatment or membrane treatment. For the purpose of attaining complete denitrification and/or decomposition of BOD components, it is also possible to treat the remaining portion of the nitrified wastewater 7 successively in a denitrification tank (not shown) and a re-aeration tank (not shown), a tank for treating wastewater by BOD decomposing bacteria under aerobic conditions, following the treatment in the nitrification tank 3; removing the solid content from the resulting wastewater (not shown) by the ordinarily employed method such as coagulating sedimentation treatment or membrane treatment; and then releasing or recycling the residue.

Alternatively, the obligatory anaerobic tank and denitrification tank which are illustrated in FIG. 1 are combined into one denitrification tank, in which decolorization and denitrification of wastewater are conducted by bringing it into contact with sulfate reducing bacteria and denitrifying bacteria. Then, the wastewater thus treated may be brought into contact with nitrifying bacteria under aerobic conditions. It is preferred to return and circulate a portion of the nitrified wastewater discharged from the nitrification tank to the denitrification tank.

FIG. 2 is a flow chart of a wastewater treatment apparatus according to a second embodiment of the present invention, in which an obligatory anaerobic tank, a nitrification tank and a denitrification tank are disposed in the order of mention, and downstream of the denitrification tank, a re-aeration tank for bringing BOD decomposing bacteria into contact with the denitrified wastewater under aerobic conditions is disposed. In FIG. 2, bacteria in the obligatory anaerobic tank 1, nitrification tank 3, denitrification tank 2 and re-aeration tank 19 have been immobilized by proper microorganism Immobilization supports, respectively.

Wastewater 20 containing a nitrogen-containing dye is fed to the obligatory anaerobic tank 1, in which it is brought into contact with sulfate reducing bacteria under obligatory anaerobic conditions, whereby the nitrogen-containing dye is decomposed.

The treated wastewater 21 is fed to the nitrification tank 3 and is brought into contact with nitrifying bacteria under aerobic conditions, whereby the treated wastewater 21 Is nitrified. The nitrified water 22 is then fed to the denitrification tank 2, in which the nitrified wastewater 22 is brought into contact with denitrifying bacteria under anaerobic conditions to denitrify the nitrified wastewater 22. In the denitrification tank 2, an organic matter is utilized as a source for the synthesis of a respiratory substrate or cells of denitrifying bacteria. It may be added from the outside of the system if necessary.

Downstream of the denitrification tank 2, a re-aeration tank 19 Is disposed to treat the organic matter which has remained in the denitrified wastewater 23 without being consumed in the denitrifying reaction and is discharged from the denitrification tank 2. From the aerated wastewater 24, the solid content is removed by the ordinarily employed method such as coagulating sedimentation treatment or membrane treatment, followed by release or recycling use.

In FIGS. 1 and 2, the nitrogen-containing dye, particularly azo dye, is brought into contact with sulfate reducing bacteria in the obligatory anaerobic tank 1, which causes reductive cleavage of the azo bond in an azo dye, whereby the azo dye is decomposed into colorless aromatic amine. The aromatic amine thus obtained by the decomposition of the azo dye is brought into contact with the nitrifying bacteria in the nitrification tank 3, whereby the structure such as aromatic ring or hetero ring is decomposed.

A hydrogen sulfide gas generated in the obligatory anaerobic tank 1 can be treated in the conventional manner. In FIG. 1, the anaerobic condition is promoted by the introduction of the gas into the denitrification tank 2 downstream of the obligatory anaerobic tank; and in FIG. 2, the hydrogen nitride gas is introduced into the nitrification tank 3 downstream of the obligatory anaerobic tank, in which it can be removed by oxidative reaction.

For preventing spillage of the microorganism immobilization support, it is desired to attach a screen 25 to the outlet of each of the obligatory anaerobic tank 1, denitrification tank 2 and nitrification tank 3 in FIG. 1 and to the outlet of each of the obligatory anaerobic tank 1, nitrification tank 3, denitrification tank 2 and re-aeration tank 19.

Each of the obligatory anaerobic tank 1, denitrification tank 2 and nitrification tank 3 in FIG. 1, and the obligatory anaerobic tank 1, nitrification tank 3, denitrification tank 2 and re-aeration tank 19 of FIG. 2 is filled with a support having sulfate reducing bacteria, denitrifying bacteria, nitrifying bacteria or BOD decomposing bacteria immobilized thereon. The nature of the support may be determined, depending on the need. The sulfate reducing bacteria, denitrifying bacteria, nitrifying bacteria and BOD decomposing bacteria included in and immobilized to a microorganism immobilization support in advance may be employed. Alternatively, it is possible to utilize spontaneous adhesion of bacteria to the microorganism immobilization support which has been poured in each tank in advance.

EXAMPLES

The present invention will hereinafter be described more specifically by Examples. It should however be borne in mind that the present invention is not limited to or by them. The chromaticity, BOD (Biochemical Oxygen Demand) concentration and T-N (Total-Nitrogen) concentration of each of the actual wastewater and treated wastewater were measured in accordance with Testing Methods for Industrial Water (JIS K 0101-1991).

Example 1

A wastewater treatment apparatus was manufactured in such a manner that an obligatory anaerobic tank, a denitrification tank and a nitrification tank were disposed in the order of mention and 75% of nitrified wastewater discharged from the nitrification tank was returned-circulated to the denitrification tank. Each tank had a capacity of 150 L. The obligatory anaerobic tank was filled with, as a microorganism immobilized support, 10% (by weight, which will equally apply hereinafter) of acetalized polyvinyl alcohol hydrogel (which will hereinafter be called "PVA gel" simply) having sulfate reducing bacteria immobilized thereon. The PVA gel was caused to flow by an agitator. The denitrification tank was filled with 10% of PVA gel having denitrifying bacteria immobilized thereon and using an agitator, the PVA gel was caused to flow similarly. The nitrification tank was filled with 10% of PVA gel having nitrifying bacteria immobilized thereon and aeration was conducted via an air diffusing tube. As the wastewater, actual wastewater containing Acid Orange 7 and Acid Blue 126 was employed.

The actual wastewater had a chromaticity of 360, BOD concentration of 1545 mg/L and T-N concentration of 408 mg/L. The chromaticity of the wastewater at the outlet of the nitrification tank was 18, clearly suggesting the decolorization of the wastewater. The BOD and T-N concentrations of the wastewater were 18 mg/L and 20 mg/L, respectively.

Comparative Example

In a similar manner to that employed for Example 1 except that the obligatory anaerobic tank was omitted, wastewater treatment was conducted. The BOD concentration of the treated wastewater at the outlet of the nitrification tank was 19 mg/L, almost a similar level to that of Example, but the T-N concentration was 68 mg/L and chromaticity was 203, indicating that the wastewater treated in Comparative Example was not decolorized.

Example 2

A wastewater treatment apparatus was manufactured in such a manner that an obligatory anaerobic tank, a nitrification tank, a denitrification tank and a re-aeration tank were disposed in the order of mention. Each tank had a capacity of 150 L. The obligatory anaerobic tank was filled with, as a microorganism immobilized support, 10% of acetalized PVA gel having sulfate reducing bacteria immobilized thereon. The PVA gel was caused to flow by an agitator. The nitrification tank was filled with lot of PVA gel having nitrifying bacteria immobilized thereon and aeration was conducted via an air diffusing tube. The denitrification tank was filled with lot of PVA gel having denitrifying bacteria immobilized thereon and using an agitator, the PVA gel was caused to flow similar to the case of the obligatory anaerobic tank. A necessary amount of methanol was added to the denitrification tank. The re-aeration tank was filled with 10% of PVA gel having BOD decomposing bacteria immobilized thereon and aeration was conducted via an air diffusing tube, and a remaining BOD portion without being consumed in the denitrifying reaction was decomposed. As the wastewater, actual wastewater containing Acid Orange 7, Acid Blue 126 and a high amount of T-N concentration mainly consist of urea was employed.

The actual wastewater had a chromaticity of 420, BOD concentration of 460 mg/L and T-N concentration of 590 mg/L. The chromaticity of the wastewater at the outlet of the nitrification tank was 18, clearly suggesting the decolorization of the wastewater. The BOD and T-N concentrations of the wastewater were 17 mg/L and 18 mg/L, respectively.

Example 3

A wastewater treatment apparatus was manufactured in such a manner that a denitrification tank and a nitrification tank were disposed in the order of mention and 75% of nitrified wastewater discharged from the nitrification tank was returned-circulated to the denitrification tank. The denitrification tank and the nitrification tank had a capacity of 300 L and 150 L, respectively. The denitrification tank was filled with, as a microorganism immobilized support, 10% (by weight, which will equally apply hereinafter) of acetalized polyvinyl alcohol hydrogel (which will hereinafter be called "PVA gel" simply) having sulfate reducing bacteria and denitrifying bacteria immobilized thereon. The PVA gel was caused to flow by an agitator. The nitrification tank was filled with 10% of PVA gel having nitrifying bacteria immobilized thereon and aeration was conducted via an air diffusing tube. As the wastewater, actual wastewater containing Acid Orange 7 and Acid Blue 126 was employed.

The actual wastewater had a chromaticity of 310, BOD concentration of 1230 mg/L and T-N concentration of 375 mg/L. The chromaticity of the wastewater at the outlet of the nitrification tank was 21, clearly suggesting the decolorization of the wastewater. The BOD and T-N concentrations of the wastewater were 19 mg/L and 24 mg/L, respectively.

The invention claimed is:

1. A wastewater treatment apparatus, comprising:
   a source of a nitrogen-containing dye containing wastewater,
   an inlet connected to an obligatory anaerobic tank to bring said wastewater containing a nitrogen-containing dye into contact with sulfate-reducing bacteria in said anaerobic tank under obligatory anaerobic conditions,
   a nitrification tank to bring the wastewater into contact with nitrifying bacteria in said nitrification tank under aerobic conditions, and
   a denitrification tank to bring the wastewater into contact with the denitrifying bacteria in said denitrification tank under anaerobic conditions.

2. The wastewater treatment apparatus of claim 1, wherein the obligatory anaerobic tank, the denitrification tank and the nitrification tank are disposed in the order of mention and a portion of the treated water discharged from the nitrification tank is caused to return and circulate to the denitrification tank.

3. The wastewater treatment apparatus of claim 1, wherein the obligatory anaerobic tank, the nitrification tank and the denitrification tank are disposed in the order of mention and a re-aeration tank for bringing BOD decomposing bacteria into contact with the wastewater under aerobic conditions is disposed downstream of the denitrification tank.

4. A wastewater treatment apparatus, comprising:
   a source of a nitrogen-containing dye containing wastewater,
   an inlet connected to a denitrification tank to bring said wastewater containing a nitrogen-containing dye into contact with sulfate-reducing bacteria and denitrifying bacteria in said denitrification tank under obligatory anaerobic conditions and a nitrification tank to bring the wastewater into contact with nitrifying bacteria in said nitrifying tank under aerobic conditions are disposed in the order of mention, whereby a portion of the treated water discharged from the nitrification tank is returned and circulated to the denitrification tank.

5. The wastewater treatment apparatus of claim 1, wherein the bacteria have been immobilized by a microorganism immobilization support in at least one tank selected from the group consisting of the obligatory anaerobic tank, the nitrification tank and the denitrification tank.

6. The wastewater treatment apparatus of claim 3, wherein the bacteria have been immobilized by a microorganism immobilization support in at least one tank selected from the group consisting of the obligatory anaerobic tank, the nitrification tank, the denitrification tank and the re-aeration tank.

7. The wastewater treatment apparatus of claim 4, wherein the bacteria have been immobilized by a microorganism immobilization support in at least one tank selected from the group consisting of the nitrification tank and the denitrification tank.

8. The wastewater treatment apparatus of claim 5, wherein the microorganism immobilization support is a least one support selected from the group consisting of a gelled support, a plastic support and a fibrous support.

9. The wastewater treatment apparatus of claim 8, wherein the gelled support is a polyvinyl alcohol hydrogel.

10. A method of treating wastewater containing a nitrogen-containing dye, which comprise the following steps (1) to (3):
   (1) contacting a wastewater containing a nitrogen-containing dye with sulfate reducing bacteria under obligatory anaerobic conditions;
   (2) contacting a wastewater with nitrifying bacteria under aerobic conditions; and
   (3) contacting a wastewater with denitrifying bacteria under anaerobic conditions.

11. The method of treating wastewater of claim 10, wherein the bacteria have been immobilized by a microorganism immobilization support in at least one tank selected from the group consisting of an obligatory anaerobic tank, a nitrification tank and a denitrification tank.

12. The method of treating wastewater of claim 11, wherein the bacteria have been immobilized by a microorganism immobilization support in at least one tank selected from the group consisting of a nitrification tank and a denitrification tank.

13. The method of treating wastewater of claim 12, wherein the microorganism immobilization support is a least one support selected from the group consisting of a gelled support, a plastic support and a fibrous support.

14. The method of treating wastewater of claim 13, wherein the gelled support is a polyvinyl alcohol hydrogel.

* * * * *